(12) United States Patent
Komaki

(10) Patent No.: US 8,908,379 B2
(45) Date of Patent: Dec. 9, 2014

(54) CASE STRUCTURE FOR PORTABLE ELECTRONIC DEVICE, PORTABLE ELECTRONIC DEVICE AND METHOD FOR MANUFACTURING SAME

(75) Inventor: Eisuke Komaki, Saitama (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 361 days.

(21) Appl. No.: 13/263,056

(22) PCT Filed: Apr. 19, 2010

(86) PCT No.: PCT/JP2010/056907
§ 371 (c)(1),
(2), (4) Date: Oct. 5, 2011

(87) PCT Pub. No.: WO2010/125936
PCT Pub. Date: Nov. 4, 2010

(65) Prior Publication Data
US 2012/0033393 A1 Feb. 9, 2012

(30) Foreign Application Priority Data
Apr. 28, 2009 (JP) .................................. 2009-109336

(51) Int. Cl.
*H05K 5/00* (2006.01)
(52) U.S. Cl.
USPC ........................................................ 361/752
(58) Field of Classification Search
USPC ........................................................ 361/752
See application file for complete search history.

(56) References Cited

U.S. PATENT DOCUMENTS

| 8,461,248 | B2 * | 6/2013 | Sato et al. | 524/513 |
| 2003/0210530 | A1 * | 11/2003 | Powell et al. | 361/727 |
| 2005/0001767 | A1 * | 1/2005 | Wulff et al. | 343/700 MS |
| 2006/0144683 | A1 * | 7/2006 | White et al. | 200/341 |
| 2008/0131112 | A1 | 6/2008 | Aoki et al. | |
| 2009/0052887 | A1 | 2/2009 | Cheng et al. | |
| 2010/0208447 | A1 * | 8/2010 | Nishihata | 361/818 |

FOREIGN PATENT DOCUMENTS

| JP | 6-196478 | A | 7/1994 |
| JP | 2000-315869 | A | 11/2000 |
| JP | 2003-331223 | A | 11/2003 |
| JP | 2004134589 | A | 4/2004 |
| JP | 2005191040 | A | 7/2005 |
| JP | 2005318329 | A | 11/2005 |
| JP | 2006049446 | A | 2/2006 |
| JP | 2008049621 | A | 3/2008 |
| JP | 2008-182501 | A | 8/2008 |

OTHER PUBLICATIONS

International Search Report for PCT/JP2010/056907 mailed May 25, 2010.

(Continued)

*Primary Examiner* — Forrest M Phillips
(74) *Attorney, Agent, or Firm* — Sughrue Mion, PLLC

(57) ABSTRACT

The present invention includes: a rear case (12) that includes a quadrangular first opening (26) into which a part of a first electronic component (21) to be housed inside the rear case (12) is inserted, and a rear panel arranged at a position where the rear panel covers the first opening (26) of the rear case (12). The rear case (12) includes a recess portion (30) extending from an inner peripheral side of the first opening (26) toward an outer peripheral side of the first opening (26) at each corner of the first opening (26).

6 Claims, 5 Drawing Sheets

(56) References Cited

OTHER PUBLICATIONS

The Extended European Search Report for EP Application No. 10769635.3 dated on Dec. 6, 2013.

Japanese Office Action for JP Application No. 2009-109336 mailed on Nov. 26, 2013 with Partial English Translation.

Office Action issued by Japanese Patent Office in Japanese Patent Application No. 2009-109336 mailed Mar. 11, 2014.

* cited by examiner (A-A)

1

CASE STRUCTURE FOR PORTABLE ELECTRONIC DEVICE, PORTABLE ELECTRONIC DEVICE AND METHOD FOR MANUFACTURING SAME

TECHNICAL FIELD

The present invention relates to a case structure for a portable electronic device including a case member housing an electronic component inside, a portable electronic device, and a method for manufacturing a portable electronic device.

BACKGROUND ART

As an example of portable electronic devices, a folding portable telephone includes a receiver section-side housing in which a main display panel is arranged, and a transmitter section-side housing in which operation buttons are arranged, the receiver section-side housing and the transmitter section-side housing being pivotally connected via a hinge portion. The receiver section-side housing includes a combination of a pair of a front case and a rear case.

As an example of a receiver section-side housing included in a portable telephone related to the present invention, there is a known configuration in which a rear cover, which is made of a transparent resin material, is attached to a rear case, which is made of an opaque resin material for decorative effect enhancement (see, for example, patent literature 1).

Furthermore, where a portable electronic device employs a configuration in which light-emitting components such as LEDs (light-emitting diodes) and/or a sub display panel are arranged on the rear case side, a rear cover covers, these light-emitting components, is made of a light-transmissive material while a rear case is made of an opaque material.

In addition, in order to provide two different types of decorative processing, for example, the housing of a portable telephone has a configuration in which a rear cover, to which decorative, processing applied, which is different from decorative processing applied to a rear case, is attached to the rear case.

CITATION LIST

Patent Literature

Patent Literature 1: JP2008-49621A (FIG. 3)

SUMMARY OF INVENTION

Technical Problem

As described above, in recent years, portable telephones that include a structure in which a rear cover is attached to a rear case, are becoming increasingly thinner. In connection with that, in order to reduce the thickness of the housing to the extent equal to or exceeding an extent in which electronic components on a circuit board housed inside the housing and the rear cover interfere with each other, there has been proposed a configuration in which a rear case includes openings, into which parts of such components in a height (thickness) direction, i.e., a direction perpendicular to a mounting surface of a circuit board, are inserted, that is, "structure for preventing contact with a component". As described above, where an electronic component having a quadrangular shape on a plane parallel to a mounting surface of a circuit board is inserted into the opening of a rear case, the opening having a quadrangular shape whose size is somewhat larger than the external dimensions of the electronic component. As described above, the opening is formed as small as possible, thereby suppressing a decrease in mechanical strength in the rear case due to the formation of the opening.

However, where the rear case includes the quadrangular opening, when an external force such as an impact or a pressing force from the outside of the housing is applied to the housing while the portable telephone is being handled, stress concentrates on the four corners of the opening. Consequently, cracking may occur in the our corners of the opening of the rear case, resulting in breakage of the rear case.

In order to prevent such stress concentration, each of the four corners of the quadrangular opening can have a circular arc shape. However, where a quadrangular electronic component is inserted into the opening with its corner portions each having a circular arc shape, it is necessary to prevent interference between the angulated corner portions of the electronic component and the corner portions of the opening. Therefore, it is necessary to form the opening large according to the amount of interference between the angulated corner portions of the electronic component and the corners portions of the opening, which results in a decrease in the mechanical strength of the rear case in which the opening is formed.

An object of the present invention to provide a case structure for a portable electronic device, a portable electronic device and a method for manufacturing the same, which can solve the aforementioned problem. An example of the object is to prevent breakage of a case member of a portable electronic device even though the portable electronic device is designed to be thinner.

Solution to Problem

A case structure for a portable electronic device according to one aspect of the present invention includes: a case member that has a quadrangular opening into which a part of an electronic component, which is to be housed inside the case member, is inserted; and a cover member which is arranged at a position where the cover member covers the opening of the case member. Each corner portion of the opening of the case member includes a recess portion extending from an inner peripheral surface of the opening toward an outer peripheral side of the opening.

Also, a portable electronic device according to the present invention includes: a case structure for a portable electronic device according to the present invention; and a circuit board with an electronic component mounted thereon.

Also, a method for manufacturing a portable electronic device according to the present invention includes: forming a case member that has an opening, into which a part of an electronic component to be housed inside the case member is inserted; and forming a cover member arranged at a position where the cover member covers the opening of the case member. Forming a case member includes forming a recess portion extending from an inner peripheral surface of the opening toward an outer peripheral side of the opening at each corner of the opening.

Advantageous Effect of Invention

As described above, the present invention enables preventing breakage of a case member of a portable electronic device even though the portable electronic device is designed to be thinner.

DESCRIPTION OF EMBODIMENTS

Hereinafter, a specific exemplary embodiment of the present invention will be described with reference to the drawings.

Figure 1:
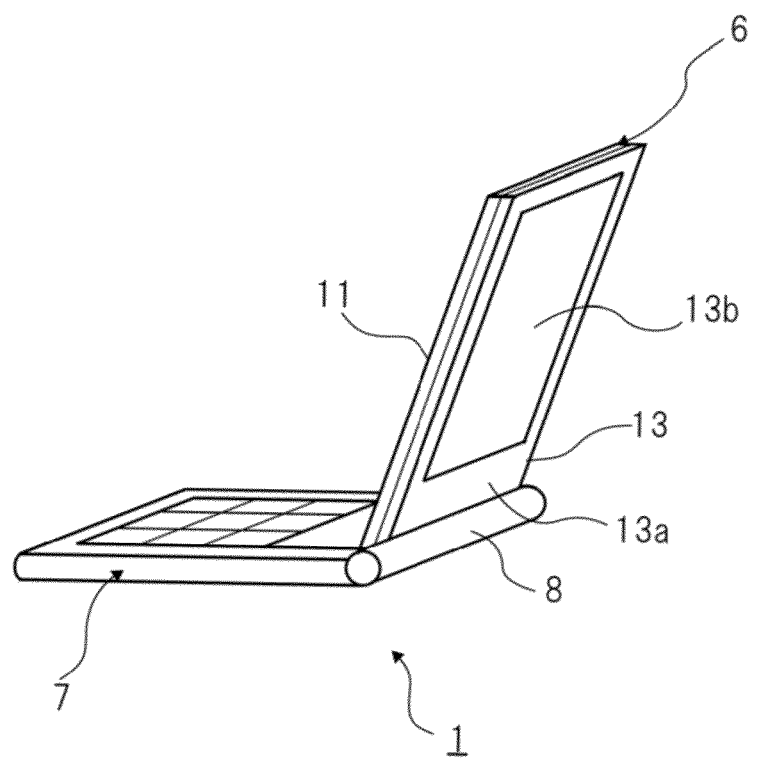
FIG. 1 is a schematic diagram illustrating a portable telephone according to an exemplary embodiment.
Figure 2:
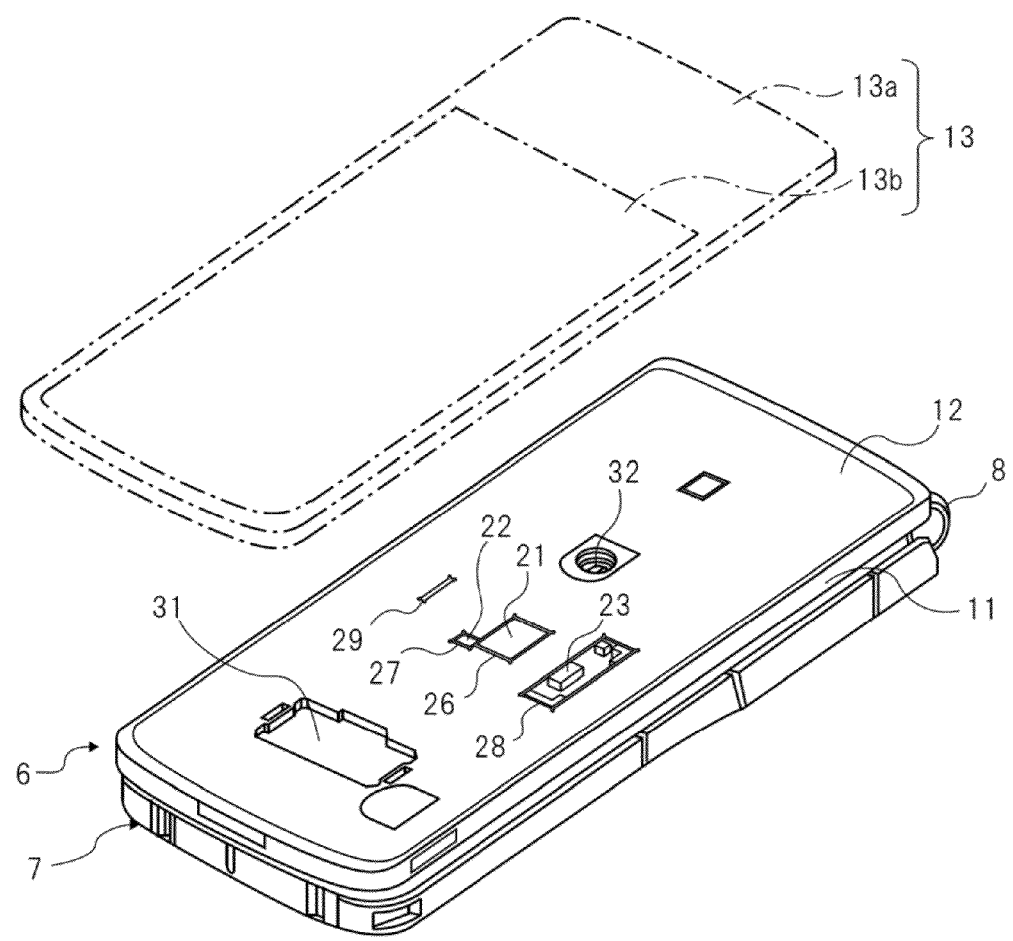
FIG. 2 is a perspective diagram illustrating a receiver section-side housing of a portable telephone according to an exemplary embodiment.

A portable telephone according to an exemplary embodiment will be described as an example of a portable electronic device according to the present invention. As illustrated in FIGS. 1 and 2, portable telephone 1 includes receiver section-side housing 6 in which a main display panel is arranged, and transmitter section-side housing 7 in which operation buttons 9 are arranged, receiver section-side housing 6 and transmitter section-side housing 7 being pivotally connected via hinge portion 8.

Receiver section-side housing 6 includes a pair of front cases 11 and rear case 12, and rear cover 13, which is a cover member, rear cover 13 being assembled to rear case 12, which is a cover member. Front case 11 and rear case 12 each is made of an opaque resin material. Rear cover 13 includes rear cover body 13a and rear panel 13b attached to rear cover body 13a. In rear cover 13, rear cover body 13a includes an opaque resin material, and rear panel 13b includes a light-transmissive resin material.

Figure 4:
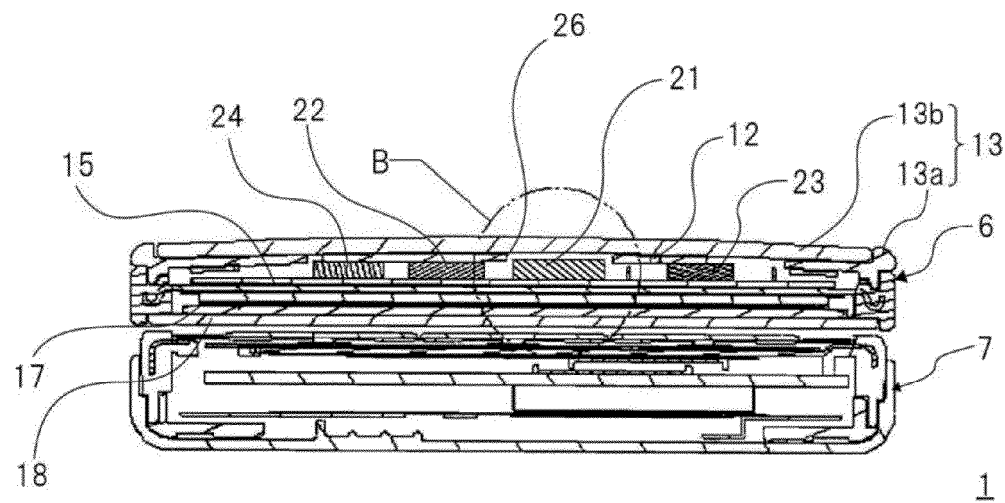
FIG. 4 is a cross-sectional diagram along line A-A of the portable telephone according to the exemplary embodiment illustrated in FIG. 3.

Also, as illustrated in FIG. 4, in receiver section-side housing 6, circuit board 15 with electronic components 16 mounted thereon are arranged, and electronic components 16 are housed inside rear case 12. Furthermore, in receiver section side-housing 6, main display panel 17, for example, a liquid-crystal display panel or an organic EL (electroluminescence) display, is arranged. Main display panel 17 is covered by front panel 18.

Figure 3:
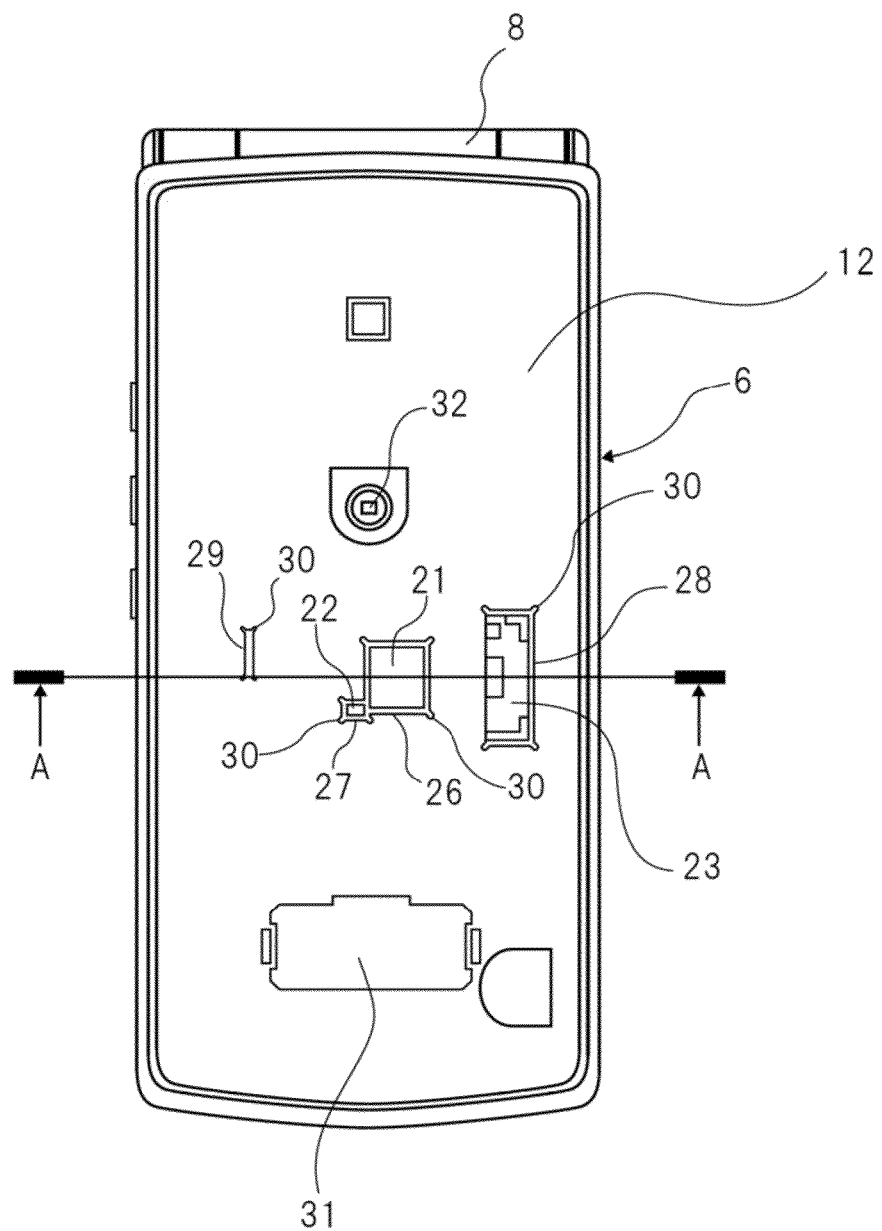
FIG. 3 is a plan view illustrating a rear case included in a portable telephone according to an exemplary embodiment.
Figure 5:
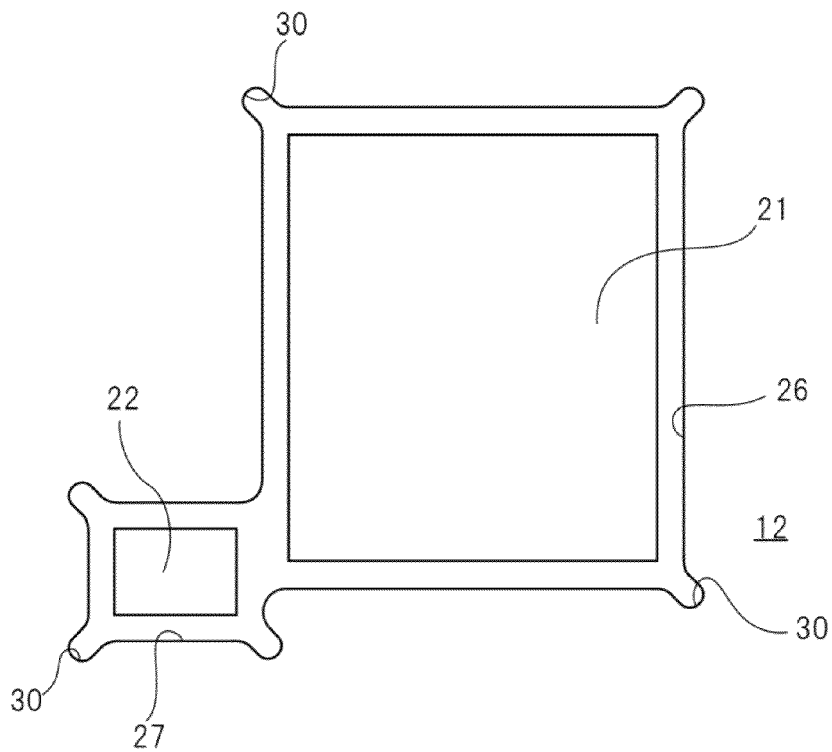
FIG. 5 is an enlarged plan view illustrating first and second openings of a rear case according to an exemplary embodiment.

As illustrated in FIGS. 2 and 3, rear case 12 includes quadrangular first opening 26 into which a part in a thickness direction of first electronic component 21 to be housed inside rear case 12 is inserted. Also, rear case 12 includes rectangular second opening 27 into which a part in a thickness direction of second electronic component 22 on circuit board 15 is inserted. As illustrated in FIG. 5, first and second electronic components 21 and 22, which are different from each other in size in a direction parallel to a mounting surface of circuit board 15, are inserted into first opening 26 and second opening 27, respectively, and the opening areas of first opening 26 and second opening 27 are different from each other.

Figure 6:
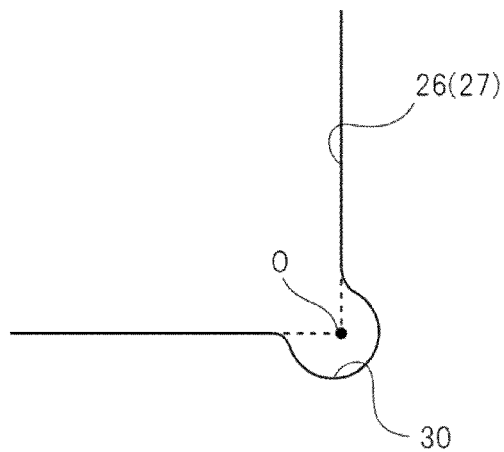
FIG. 6 is an enlarged view of recess portions included in first and second openings of a rear case according to an exemplary embodiment.

Corner portions of first opening 26 and second opening 27 include respective recess portions 30 extending from respective inner peripheral surfaces of first and second openings 26 and 27 toward respective outer peripheral sides of first and second openings 26 and 27. Rear case 12 including first and second openings 26 and 27 that contain recess portions 30 is integrally formed by a resin material. As illustrated in FIG. 6, for example, each recess portion 30 has a circular arc shape with point O, at which straight lines extending from two adjacent inner peripheral surfaces of respective first or second opening 26 or 27 cross each other, as a center thereof. Also, opposite ends of the circular arc included in each recess portion 30 are smoothly continuous with the inner peripheral surfaces of respective second opening 26 or 27 so that each forms an arc shape.

As a result of recess portions 30 being formed in such a manner as described above, no parts of openings 26 and 27 on which stress concentrates can be generated while collision of angulated corners arranged inside quadrangular electronic component openings 26 and 27 with corners of openings 26 and 27 is prevented. Accordingly, even when receiver section-side housing 6 is subjected to an external impact, while portable telephone 1 is being handled, breakage can be prevented form occurring in openings 26 and 27 of rear case 12.

The shape of each recess portion 30 is not limited to the aforementioned circular arc shape, and any shape formed so as to prevent stress concentration and avoid collision of angular corners of an electronic component with recess portion 30 can be employed. It should be understood that the shape of each recess portion 30 may be another shape such as, for example, a shape including an extension portion extending from a corner of an opening along a diagonal of the opening and a circular arc portion provided at an end of the extension portion.

Furthermore, as illustrated in FIG. 5, first opening 26 and second opening 27 are provided in such a manner that adjacent inner peripheral surfaces thereof are partially connected to each other. As a result of first opening 26 and second opening 27 being connected to each other, the number of recess portions 30 provided at respective corners can be reduced. Thus, the moldability of rear case 12 can be enhanced while structures for cavities that are contained in a mold for rear case 12 are simplified.

Figure 7:
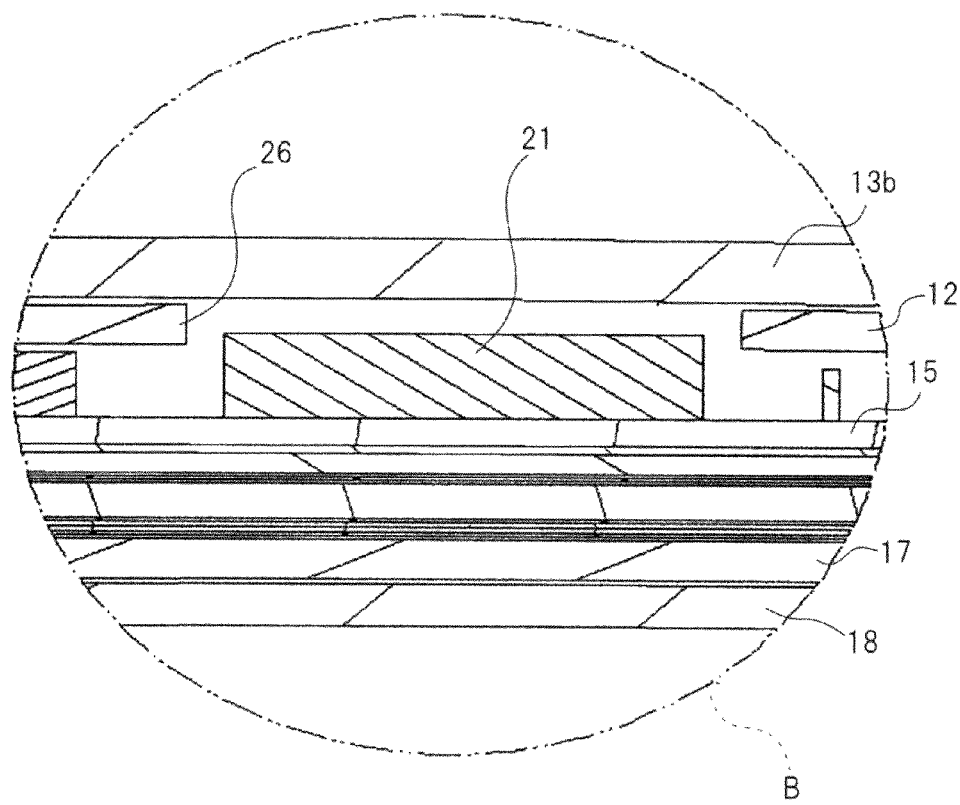
FIG. 7 is a cross-sectional diagram illustrating a first opening of a rear case according to an exemplary embodiment.

As illustrated in FIG. 7, which is an enlarged view of a part of FIG. 4, parts of first and second electronic components 21 and 22 in a thickness direction, i.e., a direction perpendicular to the mounting surface of circuit board 15, are inserted inside first and second openings 26 and 27 of rear case 12. First and second electronic components 21 and 22 do not project to rear panel 13b side from first and second openings 26 and 27.

In rear case 12, an edge portion of each of first and second openings 26 and 27 has a thickness of around 0.8 mm, and rear panel 13b has a thickness of around 1 mm.

Furthermore, as illustrated in FIGS. 3 and 4, rear case 12 includes rectangular third opening 28 into which a part on a side surface side of third electronic component 23 (right-side angulated corner in FIG. 4) is inserted. As with first and second openings 26 and 27, third opening 28 includes recess portions 30 at respective corner portions thereof.

Furthermore, rear case 12 includes slit-like fourth opening 29 into which a part on a side surface side of fourth electronic component 24 (left-side angulated corner in FIG. 4) is inserted. As with first and second openings 26 and 27, fourth opening 29 includes recess portions 30 at respective corner portions thereof.

First to fourth openings 26 to 29 of rear case 12 are then covered by rear panel 13b of rear cover 13. Rear panel 13b is bonded to rear cover body 13a via an adhesive. Rear case 12 is bonded to rear panel 13b via an adhesive.

Furthermore, as illustrated in FIGS. 2 and 3, sub display panel 31 and LED 32 are arranged in rear case 12. Display on sub display panel 31 and a light-emission state of LED 32 can be viewed through rear panel 13b.

Next, a method for manufacturing a portable telephone configured as described above will be described.

A manufacturing method according, to the present exemplary embodiment includes the steps of funning rear case 12 including first to fourth openings 26 to 29 into which parts of first to fourth electronic component 21 to 24 to be housed inside rear case 12 are inserted; and forming rear cover 13 that includes rear panel 13b attached to rear case 12, rear cover 13 covering first to fourth openings 26 to 29 of rear case 12.

The step of forming rear case 12 includes forming recess portions 30 extending from respective inner peripheral surfaces of openings 26 to 29 toward respective outer peripheral sides of openings 26 to 29 at respective corner portions of first to fourth openings 26 to 29. The step of forming rear case 12 includes integrally molding rear case 12 that has respective openings 26 to 29 in which recess portion 30 is formed, by means of a mold, using a resin material.

As described above, portable telephone 1 includes rear case 12 that has quadrangular first opening 26 into which a part in a thickness direction of first electronic component 21 is inserted, and at respective corners of first, opening 26 of rear case 12, recess portions 30 extending respective inner peripheral surfaces of first opening 26 toward respective outer peripheral sides of first opening 26 are provided. This configuration enables preventing a decrease in the mechanical strength of rear case 12, which occurs when first opening 26 of rear case 12 is formed so as to have the smallest possible opening area according to the size of first electronic component 21, as well as preventing a collision between the angulated corners of first electronic component 21 and the corners of first opening 26. Consequently, portable telephone 1 enables a decrease in thickness of the entire device as well as preventing breakage of rear case 12.

Although the above exemplary embodiment has been described in terms of a configuration in which openings that include recess portions are provided in a rear case, the configuration according to the present invention is not limited to such configuration in which a rear case includes openings, and openings may be provided in another member that houses electronic components inside. For example, when a portable telephone employs a structure in which a support plate supporting a circuit board is arranged on the from case side, openings that include recess portions may be provided in the support plate.

Furthermore, although a portable electronic device according to the present invention has been described taking a portable telephone according to an exemplary embodiment as an example, the portable electronic device according to the present invention is not limited to a portable telephone, and the present invention is suitable for use in, for example, PDAs (personal data assistant) or portable communication devices.

Although the present invention has been described above with reference to an exemplary embodiment, the present invention is not limited to the exemplary embodiment. Various alternations that can be easily understood by a person skilled in the art can be made to the configuration and the details of the present invention within the scope of the present invention.

The present application has been filed claiming as priority right based on Japanese Patent Application 2009-109336 filed Apr. 28, 2009, the entire disclosure which is incorporated herein by reference.

The invention claimed is:

1. A case structure for a portable electronic device, the case structure comprising:
   a case member including a quadrangular opening into which a part of an electronic component, which is to be housed inside said case member, is inserted; and
   a cover member which is arranged at a position where said cover member covers the opening of said case member,
   wherein each corner portion of the opening of said case member includes a recess portion extending from an inner peripheral surface of the opening toward an outer peripheral side of the opening,
   wherein the opening of said case member includes first and second openings which have different sizes, into which first and second electronic components are inserted, respectively; and
   wherein the first and second openings are connected to each other.

2. The case structure for a portable electronic device according to claim 1, wherein said case member, which has said opening which includes the recess portion, is formed by integral molding using a resin material.

3. The case structure for a portable electronic device according to claim 1, wherein the recess portion has the shape of a circular arc, and opposite ends of the circular arc are continuous with two adjacent inner peripheral surfaces of the opening so that each forms an arc shape.

4. A portable electronic device comprising:
   a case structure for a portable electronic device according to claim 1; and
   a circuit board with the electronic component mounted thereon.

5. A method for manufacturing a portable electronic device, the method comprising:
   forming case member that includes an opening, into which a part of an electronic component to be housed inside said case member is inserted; and
   forming a cover member arranged at a position where said cover member covers the opening of said case member,
   wherein said forming said case member includes forming a recess portion extending from an inner peripheral surface of the opening toward an outer peripheral side of the opening at each corner of the opening,
   wherein the opening of said case member includes first and second openings which have different sizes, into which first and second electronic components are inserted, respectively; and
   wherein the first and second openings are connected to each other.

6. The method for manufacturing a portable electronic device according to claim 5, wherein said forming said case member includes integrally molding said case member that has the opening in which the recess portion is formed, using a resin material.

* * * * *